United States Patent
Miller et al.

(10) Patent No.: US 11,677,665 B2
(45) Date of Patent: *Jun. 13, 2023

(54) SYSTEMS AND METHODS FOR IDENTIFYING CANDIDATE FLOWS IN DATA PACKET NETWORKS

(71) Applicant: Opanga Networks, Inc., Seattle, WA (US)

(72) Inventors: Michelle Miller, Tacoma, WA (US); John M. Burnette, Seattle, WA (US); Ben Hadorn, Shoreline, WA (US); Dave Gibbons, Seattle, WA (US); Sean Brown, Tacoma, WA (US)

(73) Assignee: Opanga Networks, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/349,591

(22) Filed: Jun. 16, 2021

(65) Prior Publication Data
US 2021/0314261 A1 Oct. 7, 2021

Related U.S. Application Data

(63) Continuation of application No. 16/258,467, filed on Jan. 25, 2019, now Pat. No. 11,368,398.

(Continued)

(51) Int. Cl.
*H04L 47/11* (2022.01)
*H04L 43/16* (2022.01)
(Continued)

(52) U.S. Cl.
CPC .......... *H04L 47/11* (2013.01); *H04L 41/5025* (2013.01); *H04L 43/026* (2013.01);
(Continued)

(58) Field of Classification Search
CPC ... H04L 47/11; H04L 41/5025; H04L 43/026; H04L 43/16; H04L 47/2441;
(Continued)

(56) References Cited

U.S. PATENT DOCUMENTS 7,543,052 B1 * 6/2009 Cesa Klein ......... H04L 47/2483
709/224
7,545,748 B1 6/2009 Riddle
(Continued)

FOREIGN PATENT DOCUMENTS

EP 3028417 A1 6/2016
JP 2016152453 A 8/2016

OTHER PUBLICATIONS

Extended European Search Report for EP Application No. 19743274.3, dated Sep. 20, 2021.
(Continued)

*Primary Examiner* — Michael Won

(57) ABSTRACT

A computer-implemented method and a transport manager system operate to reduce network congestion by detecting one or more data flows in a network, determining, using a candidate flow detection threshold, whether a data flow of the one or more data flows is a candidate flow, the candidate flow detection threshold being based on one or more characteristics of the one or more data flows, and in response to determining that the data flow is the candidate flow, managing the data flow. A consumption rate, a duration, a number of bytes communicated, a throughput, or aggregated characteristics of the one or more data flows may be used to determine the candidate flow detection threshold.

16 Claims, 10 Drawing Sheets

Related U.S. Application Data

(60) Provisional application No. 62/622,746, filed on Jan. 26, 2018.

(51) Int. Cl.
| | |
|---|---|
| *H04L 47/28* | (2022.01) |
| *H04L 47/2441* | (2022.01) |
| *H04L 47/41* | (2022.01) |
| *H04L 47/2483* | (2022.01) |
| *H04L 41/5025* | (2022.01) |
| *H04L 43/026* | (2022.01) |
| *H04L 43/0888* | (2022.01) |

(52) U.S. Cl.
CPC .......... *H04L 43/16* (2013.01); *H04L 47/2441* (2013.01); *H04L 47/2483* (2013.01); *H04L 47/28* (2013.01); *H04L 47/41* (2013.01); *H04L 43/0888* (2013.01)

(58) Field of Classification Search
CPC ..... H04L 47/2483; H04L 47/28; H04L 47/41; H04L 43/0888; H04L 43/0876; H04L 47/25; H04L 47/29; Y02D 30/50
See application file for complete search history.

(56) References Cited

U.S. PATENT DOCUMENTS

| | | | | |
|---|---|---|---|---|
| 7,742,406 | B1 | 6/2010 | Muppala | |
| 9,441,987 | B2* | 9/2016 | Cornwall | ................... F17D 5/02 |
| 9,571,403 | B2* | 2/2017 | Matthews | ................ H04L 47/31 |
| 2004/0013089 | A1* | 1/2004 | Taneja | ..................... H04L 47/15 370/335 |
| 2005/0286416 | A1* | 12/2005 | Shimonishi | ........... H04L 47/263 370/229 |
| 2008/0004031 | A1* | 1/2008 | Rong | ..................... H04W 28/18 455/522 |
| 2013/0223218 | A1* | 8/2013 | Vasseur | ................... H04L 45/14 370/232 |
| 2014/0056149 | A1* | 2/2014 | Mani | ....................... H04L 47/12 370/235 |
| 2014/0233421 | A1 | 8/2014 | Matthews | |
| 2014/0237118 | A1 | 8/2014 | Matthews | |
| 2015/0264098 | A1* | 9/2015 | Dao | ..................... H04W 40/08 709/231 |
| 2015/0365537 | A1* | 12/2015 | Kahn | ..................... H04L 63/00 455/408 |
| 2016/0050150 | A1* | 2/2016 | Venkatesan | .......... H04L 49/506 370/236 |
| 2016/0261510 | A1 | 9/2016 | Burnette et al. | |
| 2017/0054622 | A1* | 2/2017 | Mishra | ................. H04W 12/088 |
| 2017/0214730 | A1* | 7/2017 | Joshi | ...................... G08C 17/02 |
| 2018/0241677 | A1* | 8/2018 | Srebro | ................ H04L 47/6275 |
| 2018/0351868 | A1* | 12/2018 | Cartwright | ............. H04L 47/125 |
| 2019/0028382 | A1* | 1/2019 | Kommula | ............ H04L 45/125 |
| 2019/0199644 | A1* | 6/2019 | Ruffini | .................. H04L 47/283 |

OTHER PUBLICATIONS

International Search Report dated May 1, 2019 for PCT Application PCT/US2019/015294.

English Translation of Office Action for JP2020-561614, dated Feb. 28, 2023.

* cited by examiner

SYSTEMS AND METHODS FOR IDENTIFYING CANDIDATE FLOWS IN DATA PACKET NETWORKS

CROSS-REFERENCES TO RELATED APPLICATIONS

This application is a Continuation of U.S. patent application Ser. No. 16/258,467, filed Jan. 25, 2019, which claims the benefit of U.S. Provisional Application No. 62/622,746, filed on Jan. 26, 2018, the entire contents of which are incorporated herein by reference.

BACKGROUND

One of the growing problems faced by today's data networks (which may include wireless, wired, and/or fiber networks) is the burden placed onto these data networks by individual data flows ("flows") that consume a disproportionate amount of network resources over an extended period time during delivery to or from an end user device, which may be referred to as "elephant flows." Streaming media content (audio, video, and/or other types of content data), large downloads, and the like often produce such elephant flows.

Consumer access networks are typically designed for delivery of short bursts of data and short periods of network resource use by client devices. As a result, elephant flows may be a principal challenge to network traffic engineers trying to satisfy the peak use demands of many users using finite network resources. The existence of a large number of unmanaged elephant flows in a network may produce network congestion that results in slow network response for all users and their applications.

Accordingly, it is desirable to be able to identify candidate flows, such as elephant flows, that may be managed (such as through per-flow bandwidth allocation) to preserve network performance.

SUMMARY

Systems and methods are described herein to determine candidate flows, such as elephant flows, that may be processed and/or managed in order to prevent the performance of a network from being degraded. The candidate flows may be determined using candidate flow detection thresholds which may be dynamically adjusted.

According to various embodiments, a candidate flow detection threshold values may vary based on the network environment and many other factors. An embodiment may adjust candidate flow detection threshold values by identifying flows which are video streams, and identifying or inferring the video encoding rate being delivered to the device by directly observing the encoding rate or by observing the throughput of the flow. Then the embodiment may calculate either the amount of buffer already delivered and/or the rate at which the buffer is growing and use one or more these values to adjust one or more candidate flow detection threshold values for that flow up or down.

Another embodiment may identify the target percentage of expected candidate flows for either the entire data transport network or a subset of the network (e.g. a single eNodeB, destination, source, subscriber type, etc.) and adjust candidate flow detection threshold value(s) dynamically until the target percentage of candidate flows is met.

Another embodiment utilizes the percentile of the data transport sessions on either the entire data transport network or a subset of the data transport network (i.e. a node within the data network, or content destination, or content source, type of content, etc.) to determine a candidate flow detection threshold value. For example, within a network node, an embodiment may find a value for the 90th percentile of all data transport session sizes and determine a candidate flow detection threshold value for that network node according to that value. Other embodiments may operate similarly using other data transfer session indicators including but not limited to data transfer session throughput or duration of a data transfer session as inputs to determine the appropriate candidate flow detection threshold value.

Another embodiment may measure a frequency of candidate flow identification based on the source or destination of the data transfer session. This information may be used to either increase or decrease the candidate flow detection threshold values for that source or destination.

In another embodiment, an embodiment may receive information from another network node and utilize that information to adjust a candidate flow detection threshold up or down based on the current data transport network conditions as reported by that network node. For example, if a network node resource usage increases or decreases then the embodiment might increase or decrease the number of candidate flows it detects for that network node.

In an embodiment, a candidate flow detection threshold could be adjusted based on a time of the day so that the threshold could adapt to when the traffic increases during a certain time of the day and then decreases during a different time. Embodiments may allow multiple time periods to be identified for which different respective candidate flow detection thresholds are defined.

DETAILED DESCRIPTION

Figure 1A:
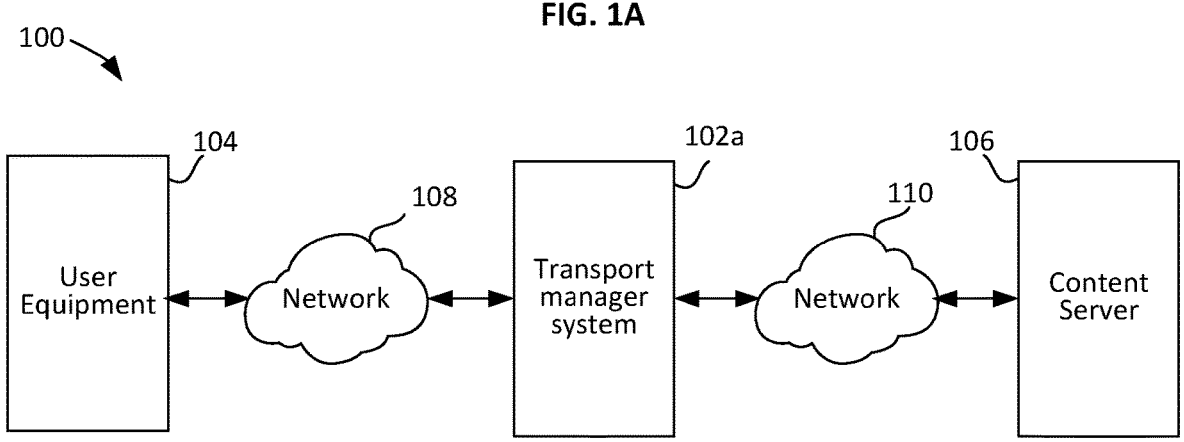
FIG. 1A illustrates an example network environment.

Systems and methods are described herein to determine candidate flows, such as elephant flows, that may be processed and/or managed in order to prevent the performance of a network from being degraded. The candidate flows may be determined using candidate flow detection thresholds.

When a data network is congested, the rate at which data packets (e.g., data flows or flows) traversing through the network will typically degrade, resulting in less than optimal data throughput. One of the causes of network congestion is the presence or existence of "elephant flows" or other types of flows that are relatively burdensome in their use of network resources that include shared throughput capacity.

Candidate flow detection can be performed at any point within a packet data network to identify burdensome flows that may be managed to improve network performance. Candidate flow detection could be done directly on the data traffic or on a copy of the traffic. There are many reasons for wanting to identify candidate flows versus other data flows in the network, including but not limited to, applying Quality of Service (QoS) policies to the candidate flows, creating security policies based on identified candidate flow behavior, statistical analysis of user behavior, etc.

A flow may be defined as a stream of datagram packets from one or more source devices to one or more destination devices, regardless of the transport protocol. As an example, a flow may include one or more data transfer sessions. For example, if an end user device such as a smartphone launches a video, it may create one data transfer session for the video stream and another for the audio stream, both going to the same destination server. According to various embodiments, from the perspective of a candidate flow detection system, this may be viewed as a single flow.

Examples of candidate flows include, for example, packet data flows associated with media content (e.g., video and/or audio files) that use large fractions of network bandwidth. In some cases, a candidate flow may be defined as a data flow that consumes a portion of the total network bandwidth that is greater than some threshold level. In other cases, a candidate flow may be defined as a data flow having a data rate that exceeds some threshold amount. In still other cases, a candidate flow may be defined as a data flow that persists for longer than a threshold duration. Of course, the values of the threshold level and threshold amount may be a design choice based on a number of factors including, for example, types of data networks involved, number of end users, total network bandwidth, and so forth. In embodiments, the thresholds levels and thresholds levels may be dynamically adjusted.

Identification of candidate flows in a network can be done based on one or more criteria. In one embodiment, a flow exceeding a size threshold (e.g. transfer at least 3 MB) is classified as a candidate flow. In an embodiment, a flow transferring packets for a minimum amount of time is classified as a candidate flow (e.g., a flow actively transferring packets for 45 seconds or greater). In another example, a candidate flow can be defined as a flow that has a data rate that exceeds some threshold value, e.g., 2 Megabits/second. U.S. patent application Ser. No. 15/060,486, filed on Mar. 3, 2106, and published as U.S. Patent Application Publication No. 2016/0261510, specifies example conditions and threshold values for identifying candidate flows such as elephant flows, and is incorporated by reference herein in its entirety.

FIG. 1A illustrates an example network environment 100 according to an embodiment. As illustrated, the network environment 100 includes a transport manager system 102a, a user equipment 104, a content server 106, a data network 108, and a data network 110. Although not explicitly illustrated in FIG. 1A, one or more additional user equipment 104 and one or more additional content servers 106 may interface with the data network 108 and/or the data network 110.

In an embodiment, the user equipment 104 may be a desktop computer, a workstation, a set-top box, a work station, a mobile computing device such as a smartphone or a tablet computer, a wearable computing device such as a smartwatch or augmented reality glasses, or the like.

In an embodiment, the content server 106 may be, for example, a server that provides media content such as video and/or audio files and/or data files to other network nodes including, for example, the user equipment 104.

The two data networks 108 and 110 may be used as paths for exchanging data, in the form of data packets, between the user equipment 104, the transport manager system 102a, and the content server 106. For example, when a media content file, such as a video or audio file, is being downloaded from the content server 106 to the user equipment 104, the media content file may be routed from the content server 106 to the user equipment 104 through the transport manager system 102a and via the data networks 108 and 110. For example, the content server 106 may transmit a media content file to the user equipment 104 via the data networks 108 and 110 by transmitting data packets with headers that includes the network address (e.g., internet protocol IP address) of the user equipment 104 as the destination. In an embodiment, the two data networks 108 and 110 may be two distinct networks, or may be part of a single large functional network.

In some embodiments, the data network 108 may be an access network (AN) that communicatively links the transport manager system 102a to the user equipment 104. For example, in some cases, the data network 108 may be one of a mobile cellular access network, such as, a second generation (2G) network, a third generation (3G) network, a long term evolution (LTE) network, a fifth generation (5G) network, and the like. In some cases, the data network 108 may include a core collection of sub-nodes that are linked to a radio access network (RAN). In some cases, portions of the data networks 108, 110, 114 may be a local area network or data center, for example, a Serving Gateway Interface-Local Area Network (SGi-LAN) or Gateway Interface-Local Area Network (Gi-LAN) located at the border of a mobile network.

In some embodiments, the data network 110 that links the content server 106 to the transport manager system 102a may be a wide-area network (WAN), which for illustrative purposes, may be considered to be the Internet.

In some embodiments, it may be assumed that at least a selected portion of packet data traffic between the content server 106 and the user equipment 104 passes through, or is in line with, the transport manager system 102a. In order to facilitate traffic through the transport manager system 102a, in one embodiment, the physical location for the transport manager system 102a may be at the border traffic aggregation point(s) connecting the data network 108 (e.g., an access network such as a cellular or Wi-Fi network) with the data network 110 (e.g., WAN). However, in other embodiments, the transport manager system 102a may be located elsewhere. In some embodiments, the transport manager system 102a may be part of a Content Delivery Network (CDN) serving one or more ANs.

As will be described with respect to FIGS. 2A and 2B, the transport manager system 102a includes a flow detector to monitor a plurality of data flows, and to select one or more of the data flows for further processing and/or management.

Figure 1B:
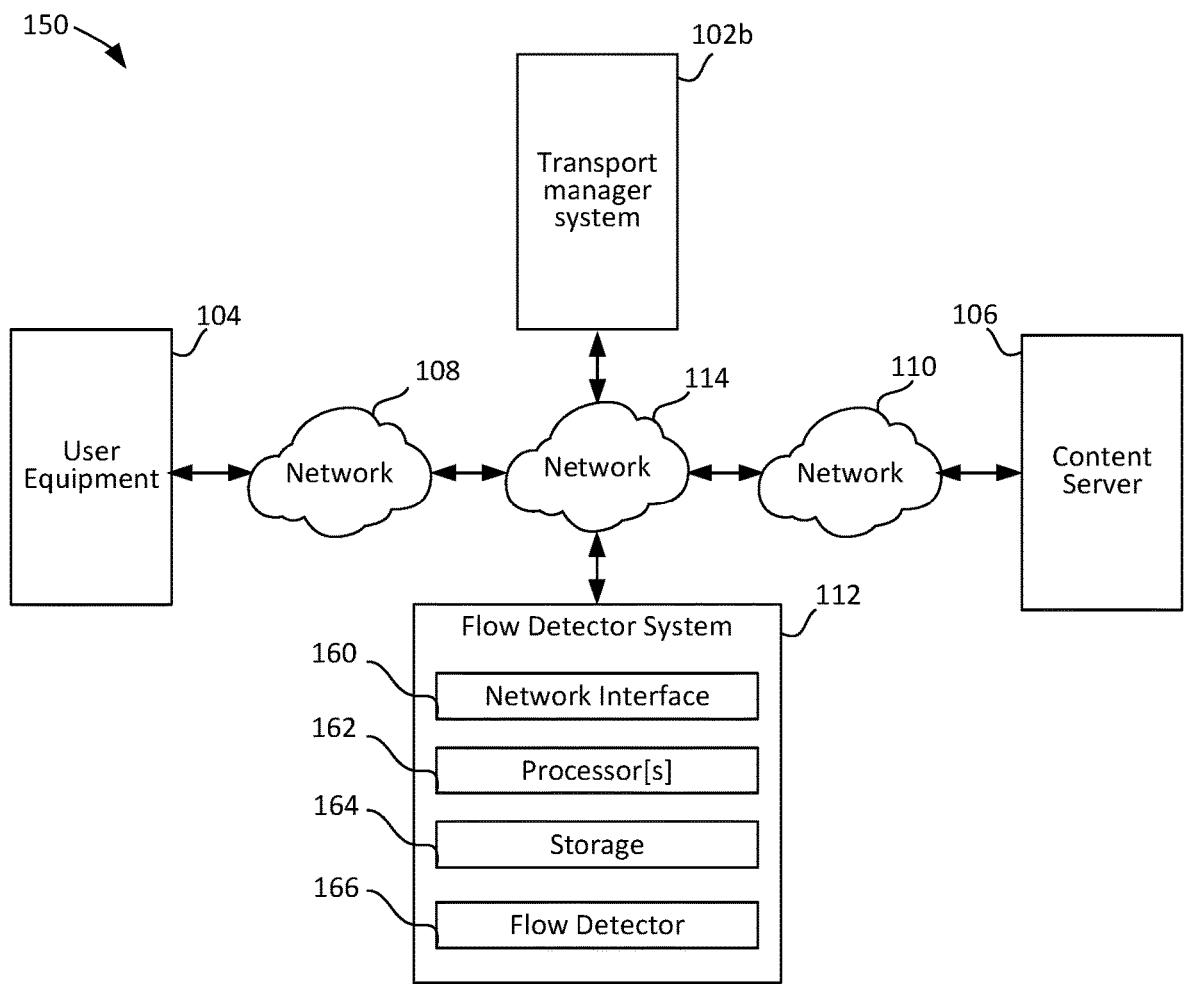
FIG. 1B illustrates another example network environment.

FIG. 1B illustrates another example network environment 150 according to an embodiment. As illustrated, the network environment 150 includes a transport manager system 102b that is designed to manage data flows between two network equipment (e.g., user equipment 104 and content server 106) similar to the transport manager system 102a of FIG. 1A. The transport manager system 102b of FIG. 1B includes components similar to those included in the transport manager system 102a of FIG. 1A. However, unlike the transport manager system 102a illustrated in FIG. 1A, the transport manager system 102b of FIG. 1B does not include a flow detector. Instead, the flow detector is part of a flow detector system 112.

The flow detector system 112 includes a network interface 160, one or more processors 162 (e.g., central processing unit (CPU), graphical processing unit (GPU), and so forth), storage 164 (e.g., volatile and/or non-volatile memory), and a flow detector 166. The flow detector 112 may be designed to, among other functions, monitor and/or sample data traffic between the content server 106 and the user equipment 104 via data networks 108, 110, and 114, as described below with reference to FIGS. 2A-2D. The flow detector system 112 and the transport manager system 102b of FIG. 1B may be linked through a data network 114, which in some embodiments, may be a Local Area Network or Software Defined Network such as a network or networks composed of directly interconnected hardware collections of routers, switches, gateways and the like. In some embodiments, the three data networks 108, 110, and 114 may be a single functional network.

In an embodiment, selective packet data flows may be identified for further processing by the flow detector system 112 based on configured policies or templates characterizing the data flows traversing the data networks 108, 110, and 114 in order to identify candidate flows. For example, the flow detector system 112 may employ the flow detector 166 to measure the average throughput, delivered data volume, duration, and other characteristics of the data flow in order to classify the flow as a candidate flow, which is a relatively burdensome type of data flow due to its relatively large, disproportionate use of network resources including shared throughput capacity, and determine that the elephant flow is a candidate flow for management.

The specific flow types (e.g., elephant flows) of packets flowing through the data networks 108, 110, and 114 may be determined based on, for example, the component packet network and transport layer headers of the packets, which may include, for example, combinations of IP source and destination addresses, transport control protocol (TCP) or User Datagram Protocol (UDP) source and destination ports, protocols (e.g., IPv4), flow labels (e.g., IPv6), flags, extension header fields, and so forth. That is, different packets may be identified as belonging to the same data flow (or virtual flow) by, for example, processing the headers of the packets to determine that the packets have, for example, the same source and destination port, protocol, flow labels, extension header fields, and so forth. Once a data flow (i.e., packet data flow) has been identified, the characteristics (such as an amount of data being carried, a duration, and so on) of the identified data flow may be ascertained in order to determine whether the data flow is a candidate flow.

In some embodiments, a data flow is identified as a candidate flow by sampling packets of an aggregate combination of one or more flows and selecting a flow that exceeds a threshold data rate measured within a defined sampling duration. In other embodiments, a data flow is identified as a candidate flow by sampling and selecting a flow that exceeds a continuous activity duration threshold which may be defined by measuring a number of consecutive data rates, or a sequence of data rates, each of which exceeds a threshold data rate. In still other embodiments, a data flow is identified as a candidate flow by randomly sampling only some of the packets of an aggregate combination of one or more flows and selecting a flow that exceeds a relative detection probability that indicates relatively disproportionate use of the aggregate traffic bandwidth. In still other embodiments, these methods may be used in combination or with other similar methods.

In some cases, when the network or transport layer packet data payloads are encrypted or obfuscated, the payload headers may be processed/examined in order to identify packets that belong to the same packet data flow. In other cases, where the packet data payloads are readable, the information in the network or transport packet payloads may be processed/examined to further help identify packets associated with a particular data flow or type of data flow (e.g. streaming video).

In some embodiments, once the flow detector system 112 has identified a candidate flow or another flow that may be burdensome, the flow detector system 112 may trigger reconfiguration of the packet forwarding logic in the data network 114 so that packets in the identified data flow are directed to pass through the transport manager system 102b in the end to end path between the source (e.g., a content server 106) and the destination (e.g., 104). For example, the flow detector system 112 may communicate the characteristics of the candidate flow to one or more routers and switches including the data network 114. Accordingly, dynamically configured forwarding or switching rules may be used to direct subsequent packets in the candidate flow to pass through the transport manager system 102b in the end-to-end path of the packets, for example, using the principles of Software Defined Networking. In other embodiments, however, the transport manager system 102b may be included in the end-to-end path, according to default rules, and the flow detector system 112 may merely inform the transport manager system 102b of detected flows that match one or more classification templates so that the detected flows are processed (e.g., by pacing the flow rate to reduce the delivery rate of the detected flows) while other traffic flows may be forwarded without processing.

In some cases, a flow may be unidirectional (e.g., either an uplink or downlink flow) or may be bidirectional by being paired with a flow in the opposite direction (e.g., packets with interchanged destination and source network addresses, interchanged port addresses, common flow label, etc.) belonging to a communicating pair of connection endpoints. In some embodiments, both directions of a bidirectional flow pair may be directed to the transport manager system 102b.

In some embodiments, the flow detector system 112 and the transport manager system 102b may be distinct functional elements as shown in FIG. 1B, or combined into a single functional unit as illustrated in FIG. 1A.

Figure 2A:
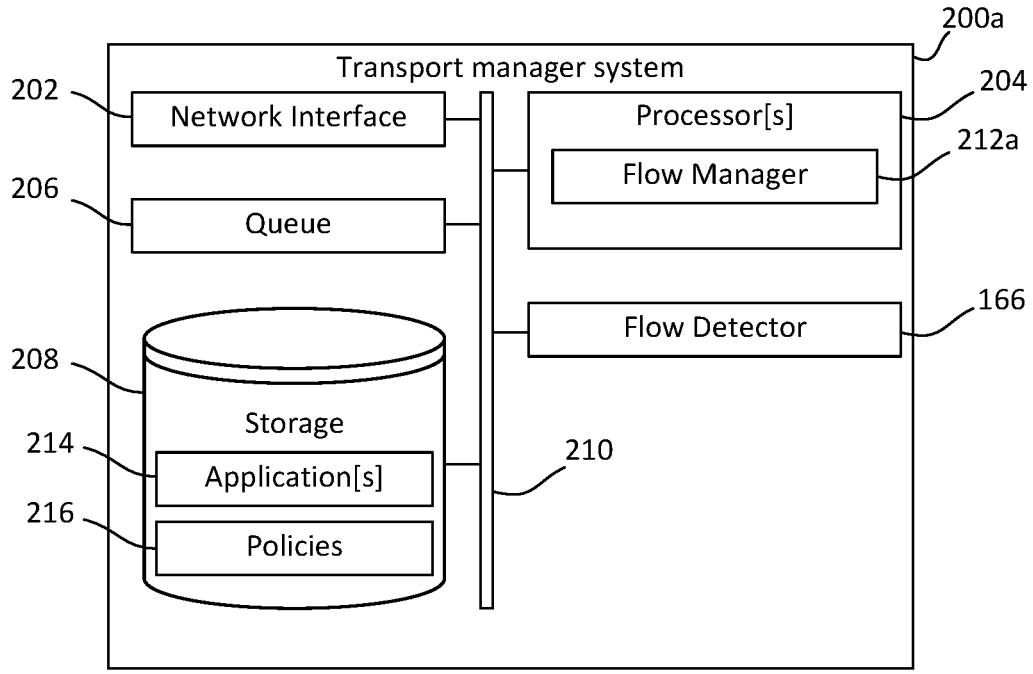
FIG. 2A is a block diagram of a transport manager system according to an embodiment.

FIG. 2A illustrate a transport manager system 200a that may be used to implement the transport manager system 102a of FIG. 1A. The transport manager system 200a includes a network interface 202 (e.g., a network interface card or "NIC"), one or more processors 204, a queue 206 (e.g., a buffer), a flow detector 166, and storage 208 (i.e. non-transitory computer-readable media, e.g., volatile and/or non-volatile memory including, for example, random access memory (RAM), read only memory (ROM), flash memory, disc memory, and so forth) that are linked together via a bus 210. The storage 208 may store one or more applications 214 (e.g., computer readable instructions) and one or more policies 216 for selecting and/or determining which packet data flows should be managed.

The flow detector 166 may be designed to, among other features, detect and monitor a plurality of data flows, and to operate as a candidate flow detector by selecting one or more of the data flows as candidate flows for further processing/management. The selection of candidate flows may be based on the one or more of the policies 216 stored in the storage 208 or from other sources. In various embodiments, the flow detector may be implemented using customized circuitry (e.g., application specific integrated circuit or ASIC), or by employing a combination of customized circuitry and software executed by programmable circuitry such as one or more processors.

As further illustrated in FIG. 2A, the transport manager system 200a further includes a flow manager 212a, which may be designed to, among other functions, measure a delivery performance (e.g., delivery throughput or some of other delivery parameter) of a data flow (i.e., packet data flow). The flow manager 212a may detect whether the network is congested based, at least in part, on the measured delivery performance of the data flow, and may pace the data flow, in response to detecting network congestion, by adjusting the delivery of the data flow to the destination (e.g., user equipment 104) in order to reduce the delivery rate of the data flow. In the embodiment illustrated in FIG. 2A, the flow manager 212a is implemented by the one or more processors 204 (or other programmable circuitry) executing one or more computer readable programming instructions (e.g., application 214). The flow manager 212a, the flow manager 212b of FIG. 2B, and the flow detector 166 of FIG. 2B are logic units that are each designed to perform the various functionalities to be described herein.

Figure 2B:
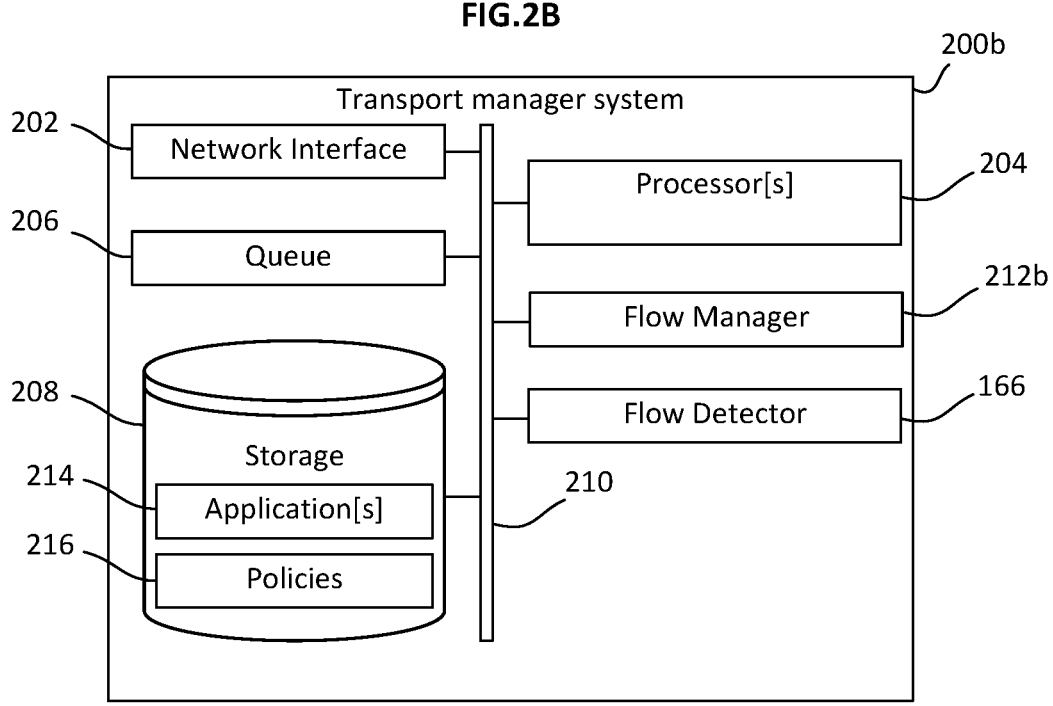
FIG. 2B is a block diagram of a transport manager system according to another embodiment.

FIG. 2B illustrate another transport manager system 200b that may be used to implement the transport manager system 102a of FIG. 1A. The transport manager system 200b includes some of the same components as the transport manager system 200a of FIG. 2A. Unlike the flow manager 212a of FIG. 2A, however, the flow manager 212b illustrated in FIG. 2B may be implemented using customized circuitry rather than being implemented using one or more processors 204 executing software (e.g., machine readable programming instructions).

In still other embodiments, the flow manager 212a of FIG. 2A or the flow manager 212b of FIG. 2B may be implemented using a combination of customized circuitry and software executed by programmable circuitry (e.g., by processor 204).

Figure 2C:
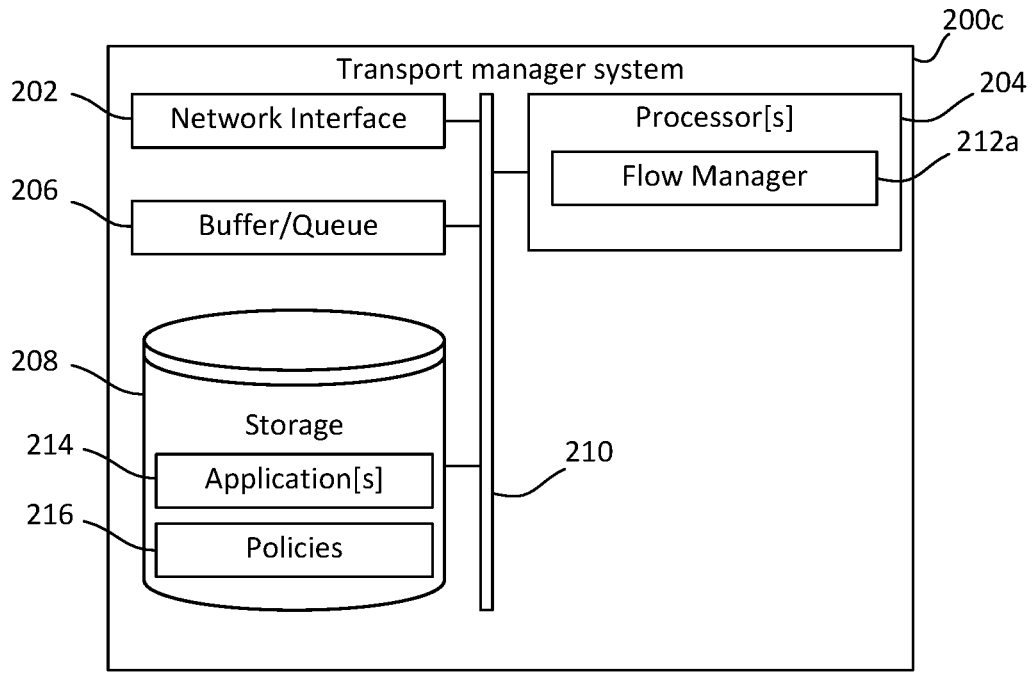
FIG. 2C is a block diagram of a transport manager system according to another embodiment.

FIG. 2C illustrates a transport manager system 200c that may be used to implement the transport manager system 102b of FIG. 1B. The transport manager system 200c includes many of the same components as the transport manager system 200a of FIG. 2A, but does not include the flow detector 166 of the transport manager system 200a.

Figure 2D:
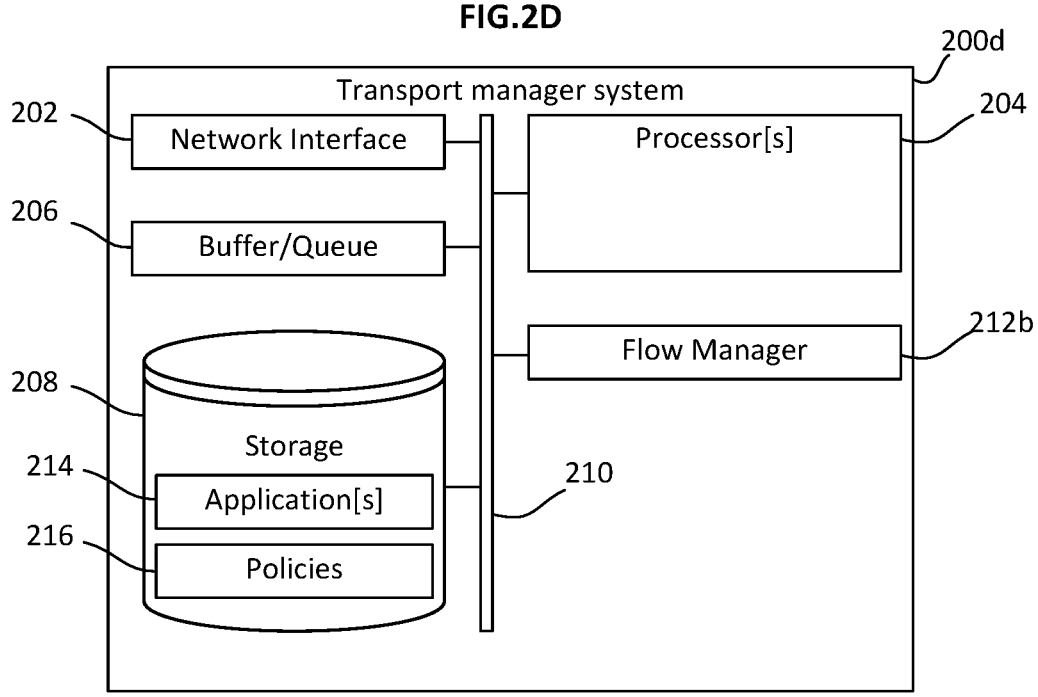
FIG. 2D is a block diagram of a transport manager system according to another embodiment.

FIG. 2D illustrates another transport manager system 200d that may be used to implement the transport manager system 102b of FIG. 1B. The transport manager system 200d includes many of the same components as the transport manager system 200b of FIG. 2B, but does not include the flow detector 166 of the transport manager system 200b.

In embodiments, a flow manager such as of the flow manager 212a or the flow manager 212b may function in conjunction with the flow detector 166 to operate as a candidate flow detector to identify candidate flows that should be managed.

Figure 3:
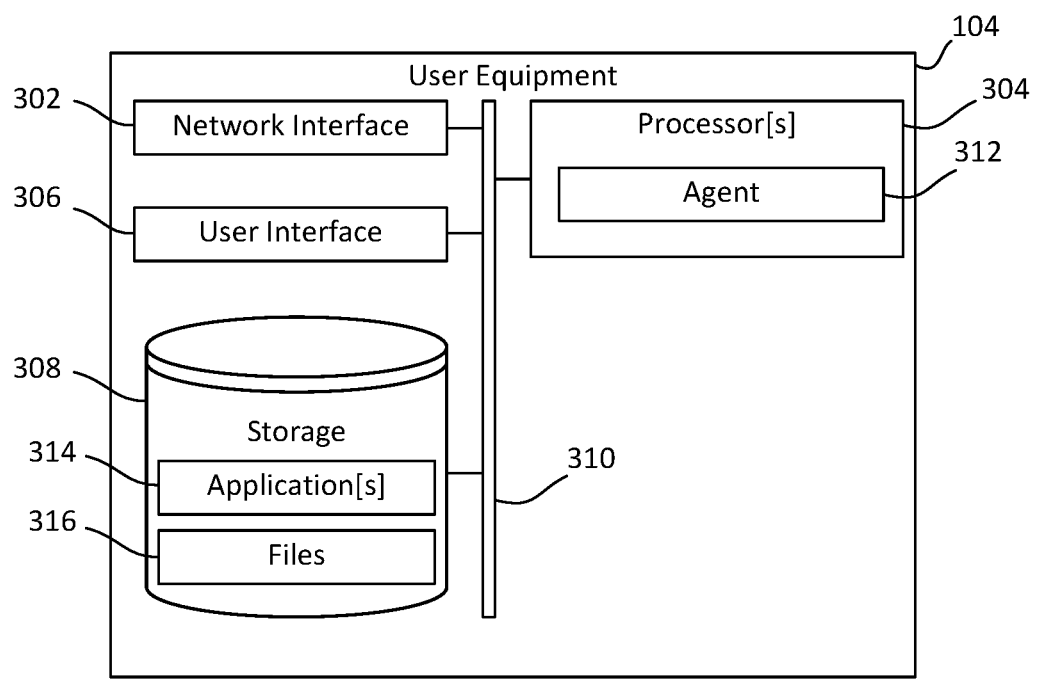
FIG. 3 is a block diagram of a user equipment according to an embodiment.

FIG. 3 is a block diagram of the user equipment 104 according to an embodiment. The user equipment 104, which in some cases, may be a mobile computing device or a desktop computer, may include a network interface 302 (e.g., a NIC), one or more processor 304, user interface 306 (e.g., including a display, speakers, keyboard, mouse, and so forth), and storage 308 (e.g., a volatile and/or non-volatile memory), that are coupled together via bus 310. The storage 308 may store one or more applications 314 and one or more files 316 (e.g., media content files such as audio and/or video files). In some embodiments, the one or more processors 304 may execute one or more computer readable instructions (e.g., an application 314) to implement an agent 312 that may be designed to facilitate the various functionalities performed by the transport manager system 102a of FIG. 1A and/or transport manager system 102b of FIG. 1B.

Embodiments relate to determining candidate flows for congestion management using a candidate flow detection threshold that is adapted to one or more of one or more characteristics of a data flow, one or more characteristics of a plurality of data flows, a time of day, a type of device, an identity of a device, an identity of an endpoint of a data flow, and the like. The plurality of data flows may be data flows throughout all or a portion a data communication network, data flows to or from an individual device, data flows to or from a particular type or model of device, data flows transiting through a node or group of nodes in a network, and so on.

Figure 4:
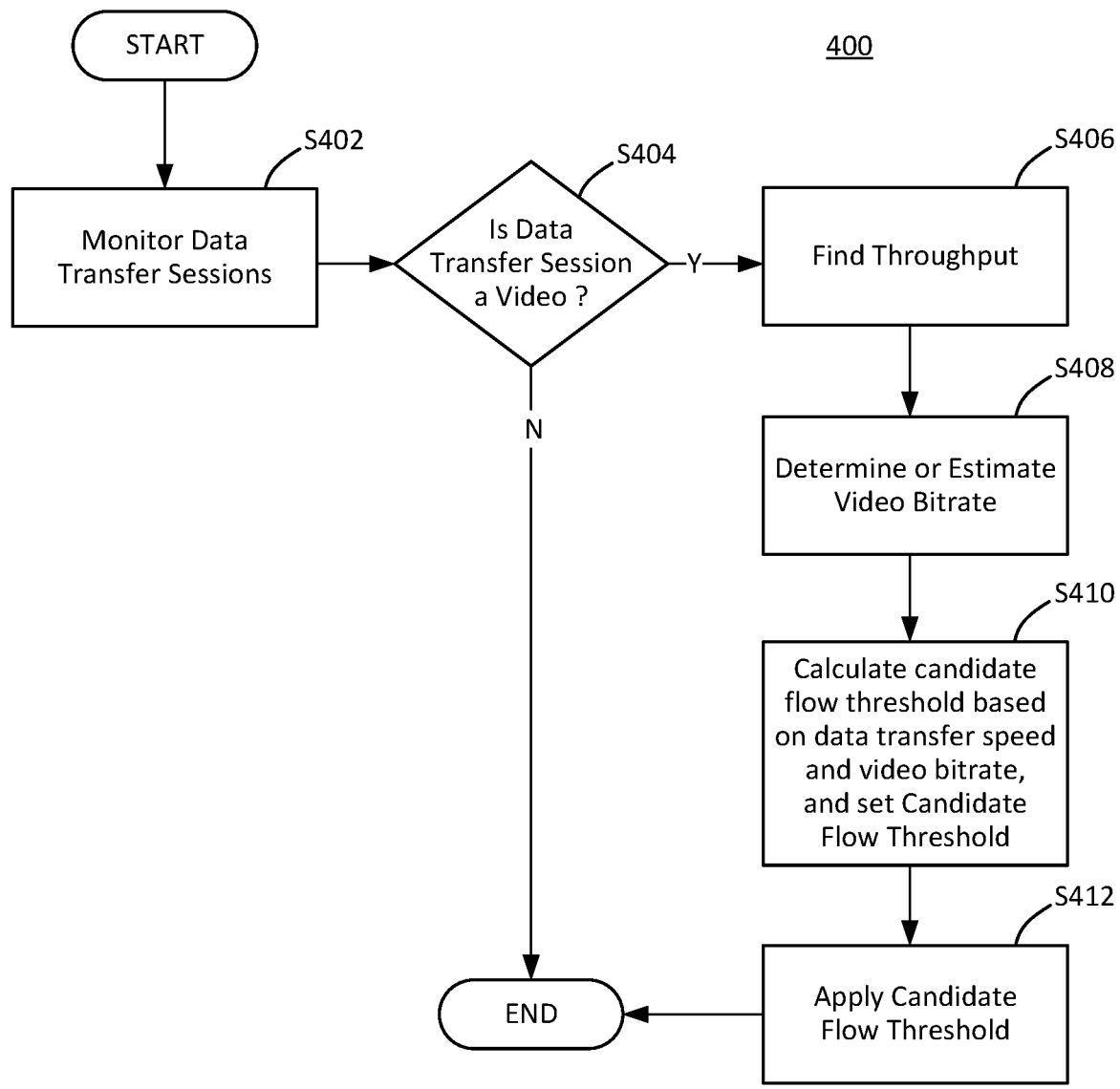
FIG. 4 illustrates decision-making logic in which a candidate flow detector according to an embodiment identifies flows that may be videos and adjusts a candidate flow detection threshold based on an amount of already delivered to a device.

FIG. 4 illustrates decision-making logic of a process 400 for a video buffer size-based candidate flow detection threshold calculation logic according to an embodiment. In the process 400, a candidate flow detector identifies flows that may be videos and adjusts a candidate flow detection threshold based on an amount of buffer (time) that may already have been delivered to a video playback device. In some embodiments, the process 400 may be performed by a flow manager such as the flow manager 212a of FIGS. 2A and 2C. In other embodiments, the process 400 may be performed by a flow manager such as the flow manager 212b of FIGS. 2B and 2C.

At S402, the process 400 detects, by monitoring data transfer sessions, data flows passing through the data transport network.

At S404, the process 400 determines for each flow whether it may be a video flow. The process 400 may detect that a flow may be a video flow through various methods including but not limited to, content destination identification (such as by recognizing an endpoint of a flow as a source of video flows), traffic pattern recognition, DNS sniffing and deep packet inspection. The identification of the data transfer session as a video may also be performed by another network node and that information conveyed to process 400. In embodiment, some methods of identifying video flows may incorrectly identify non-video data flows as video data flows, but the incorrectly identified data flows may still be identified as candidate flows and managed accordingly.

When the flow is determined to be a video flow, at S404 the process 400 proceeds to S406; otherwise, the process 400 ends.

Once a flow is determined to be a video flow, at S406 a throughput of the video flow is determined. At S408, the process 400 determines a video encoding rate (that is, a video bitrate; more generally, a consumption rate for the media being transferred by the flow) that is being delivered. The video encoding rate can be determined by observing properties of the data transfer session or inferred from the transfer rate of the data transfer session.

Once the encoding rate of the video is determined or inferred, at S410 the process 400 adjusts the candidate flow detection threshold so that the data transfer session will be identified as a candidate flow after a specific amount of video playback has been delivered to a buffer of the device receiving the data of the data transfer session.

As an example, the process 400 may seek to categorize a video flow as a candidate flow when 30 seconds of the video being transmitted using the flow is delivered at the destination of the flow. A video flow A may have a throughput of 1.5 Mbps, from which the process 400 may infer that video flow A is delivering 480p video. 480p video may be estimated to have an encoding rate of 1.3 Mbps. Accordingly, the process 400 may estimate that the extra throughput (1.5 Mbps provided versus 1.3 Mbps required) of video flow A will provide 30 seconds of video in 26 seconds (=30×1.3/1.5), and may consider the video flow A to be a candidate flow once the duration of the video flow A exceeds 26 seconds. That is, the candidate flow detection threshold for the video flow A is set to 26 seconds.

However, a video flow B may have a throughput of 7 Mbps, from which the process 400 may infer that video flow A is delivering 1080p video. 1080p video may be estimated to have an encoding rate of 5 Mbps. Accordingly, the process 400 may estimate that the extra throughput (7 Mbps provided versus 5 Mbps required) of video flow B will provide 30 seconds of video in approximately 21.4 seconds (=30×5/7), and may consider the video flow A to be a candidate flow once the duration of the video flow A exceeds 21.4 seconds.

Once a data flow is determined to be a candidate flow, it may be managed to reduce data congestion. Managing the candidate flow may include pacing the candidate flow to reduce its throughput. In an embodiment, pacing a candidate flow may be performed by inserting latencies between, delaying, or buffering packets of the candidate flow, as described in U.S. Patent Application Publication No. 2016/0261510, referenced above. In an embodiment, pacing a candidate flow may include other using other congestion control mechanisms, such as dropping packets, sending a signal to a transmitting node to cause a size of a TCP congestion window to be adjusted, and the like.

In these examples the candidate detection threshold is time, but it could have also been bytes delivered or a combination of other values that are adjusted based on the estimated buffer capacity according to various embodiments.

At S412, the process 400 evaluates the data transfer session using the candidate flow detection threshold calculated at S410, and determines whether the data transfer session is a candidate flow accordingly. If the data transfer session is determined to be a candidate flow, it may be managed as described above to reduce the potential for network congestion.

Figure 5:
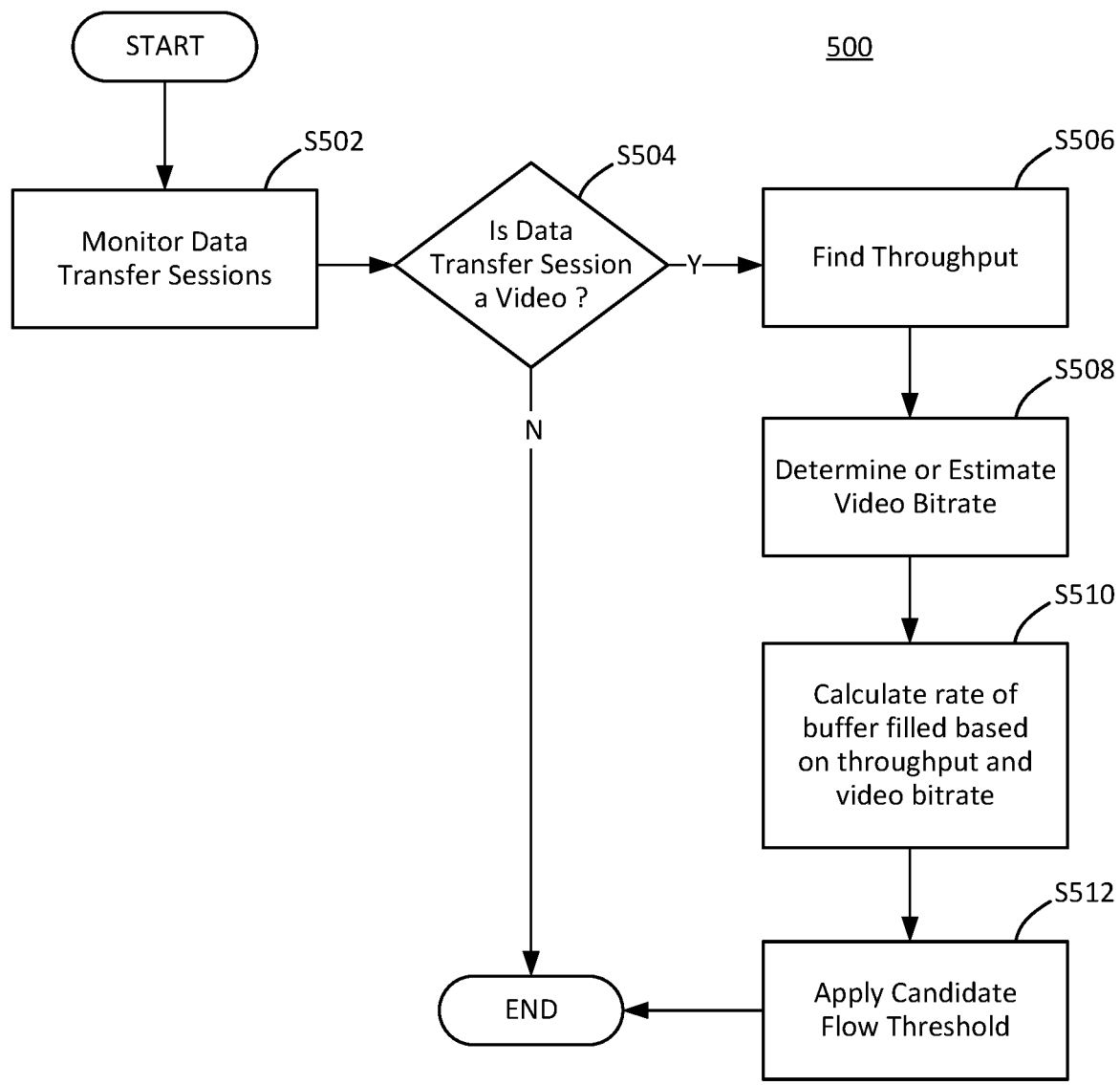
FIG. 5 illustrates decision-making logic in which a candidate flow detector according to an embodiment identifies data transfer sessions that may be videos or is notified by another network node that a data transfer session is a video and adjusts a candidate flow detection threshold based on a rate of growth of a video playback buffer.

FIG. 5 illustrates decision-making logic for a process 500 for a video buffer fill rate-based candidate flow detection threshold calculation logic according to an embodiment. In the process 500, a candidate flow detector identifies data transfer sessions that are videos or is notified by another network node that a data transfer session is a video and adjusts a candidate flow detection threshold based on a rate of growth of a video playback buffer on the video playback device.

In an implementation, steps S502 to S508 of FIG. 5 correspond to steps S402 to S408 of FIG. 4, and descriptions thereof are therefore omitted in the interest of brevity.

After the encoding rate of the data flow identified as a video flow has been determined or inferred, at S510 the process 500 adjusts the candidate flow detection threshold so that the data transfer session will be identified as a candidate flow after a buffer growth rate exceeds a target value.

As an example, a video flow A may have a throughput of 1.5 Mbps, from which the process 400 may infer that video flow A is delivering 480p video. 480p video may be estimated to have an encoding rate of 1.3 Mbps. Accordingly, the process 500 may estimate that the buffer growth rate of video flow A is 0.2 Mbps (=1.5 Mbps-1.3 Mbps).

A video flow B may have a throughput of 7 Mbps, from which the process 400 may infer that video flow A is delivering 1080p video. 1080p video may be estimated to have an encoding rate of 5 Mbps. Accordingly, the process 500 may estimate that the buffer growth rate of video flow A is 2 Mbps (=1.5 Mbps-1.3 Mbps).

At S512, the process 500 compares the estimated buffer growth rate for each video flow to the candidate flow detection threshold to determine whether each video flow is a candidate flow. For example, is the candidate flow detection threshold is 0.25 Mbps, video flow A with an estimated buffer growth rate of 0.2 Mbps would not be identified as a candidate flow, and video flow B with an estimated buffer growth rate of 2 Mbps would be identified as a candidate flow. In another embodiment, a buffer growth rate target value is added to the respective encoding rate to determine the candidate flow detection threshold for each video flow, and the throughput of each video flow is compared to the respective candidate flow detection threshold to determine whether the video flow is a candidate flow. When the throughput of a video flow exceeds its candidate flow detection threshold, the video flow is determined to be a candidate flow and may subsequently be managed to reduce network congestion.

Figure 6:
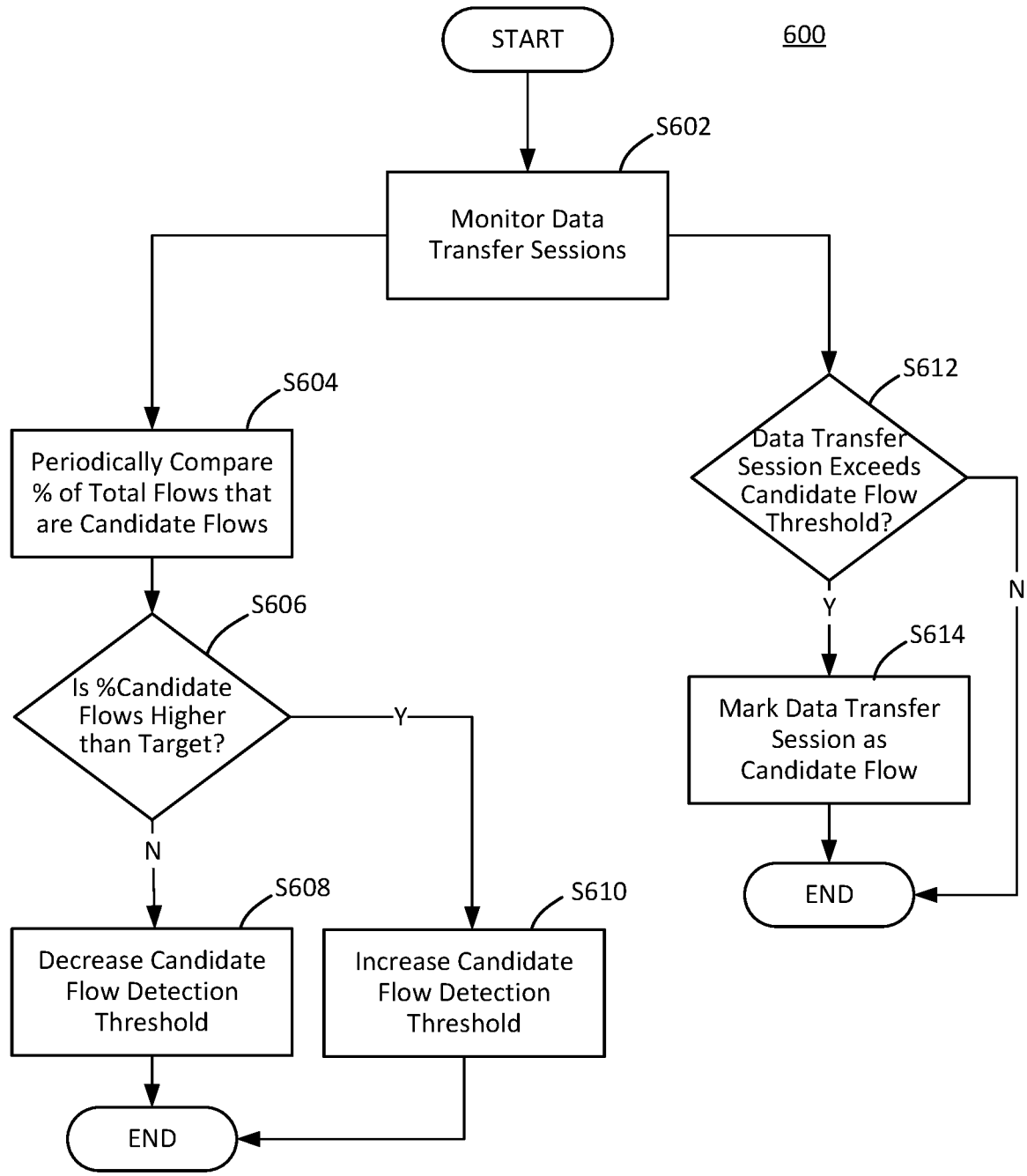
FIG. 6 illustrates decision-making logic in which a flow detector according to an embodiment adjusts a candidate flow detection threshold value to achieve a target percentage of candidate flows across a group of flows.

FIG. 6 illustrates decision-making logic of a process 600 where a flow detector adjusts the candidate flow detection threshold to achieve a target percentage of candidate flows according to an embodiment. In the process 600, a flow detector adjusts a candidate flow detection threshold value to achieve a target percentage of candidate flows across a group of flows. In FIG. 6, the two arrows originating in S602 indicate potential parallelism: S604, S606, S608, and S610 comprise a first subprocess of the process 600, S612 and S614 comprise a second subprocess of the process 600, and the first and second subprocess may be performed in parallel or in sequence, depending on the embodiment.

At S602, the process 600 detects, by monitoring data transfer sessions, data flows passing through one or more nodes of the data transport network.

At S604, the process 600 determines a percentage of active data flows that have been classified as candidate flows. For example, if 1000 data flows are currently being performed on the network, and 31 of those data flows have been determined to be candidate flows, at S602 the process 600 would determine that 3.1% of the total flows were candidate flows.

At S606, the process 600 compares the percentage of active data flows that are candidate flows to a target percentage. When the percentage of active data flows that are candidate flows is less than the target percentage, the process 600 proceeds to S608. When the percentage of active data flows that are candidate flows is greater than the target percentage, the process 600 proceeds to S610.

At S608, the process 600 decreases a candidate flow detection threshold in order to increase the number of data flows that are determined to be candidate flows.

At S610, the process 600 increases a candidate flow detection threshold in order to decrease the number of data flows that are determined to be candidate flows.

For example, when the target percentage is 3% and the process 600 determines at S604 that 3.1% of the total data flows are being classified as candidate flows, at S606 the process 600 proceeds to S610, where the process 600 alters the candidate flow detection threshold (for example, by increasing its value) so that a lower percentage of data flows will be determined to be candidate flows.

However, when the target percentage is 3% and the process 600 determines at S604 that 2.9% of the total data flows are being classified as candidate flows, at S606 the process 600 proceeds to S608, where the process 600 alters the candidate flow detection threshold (for example, by decreasing its value) so that a higher percentage of data flows will be determined to be candidate flows.

In an embodiment, the adjustment of the candidate flow detection threshold may be proportional to a difference between the determined and target percentages. For example, when the target percentage is 3%, the candidate flow detection threshold is 3 MB, and the measured percentage of current flows that are determined to be candidate flows is 2.8%, the candidate flow detection threshold may be adjusted down to 2.8 MB.

In an embodiment, the candidate flow detector could have a target percentage of candidate flows for the entire data transfer network, for a single network node, a destination node, another identifying factor, or a combination thereof. As an example, a network node may have an elephant flow detection threshold configured according to a target percentage of 3% of all data sessions transported by that network node.

At S612, the process 600 determines for a data transfer session whether the property of the corresponding data flow being used to identify candidate flows exceeds the candidate flow detection threshold. When the candidate flow detection threshold is exceeded, at S612 the process 600 proceeds to S614; otherwise the process 600 may end.

At S614, the process 600 marks the data transfer session as a candidate flow.

Figure 7:
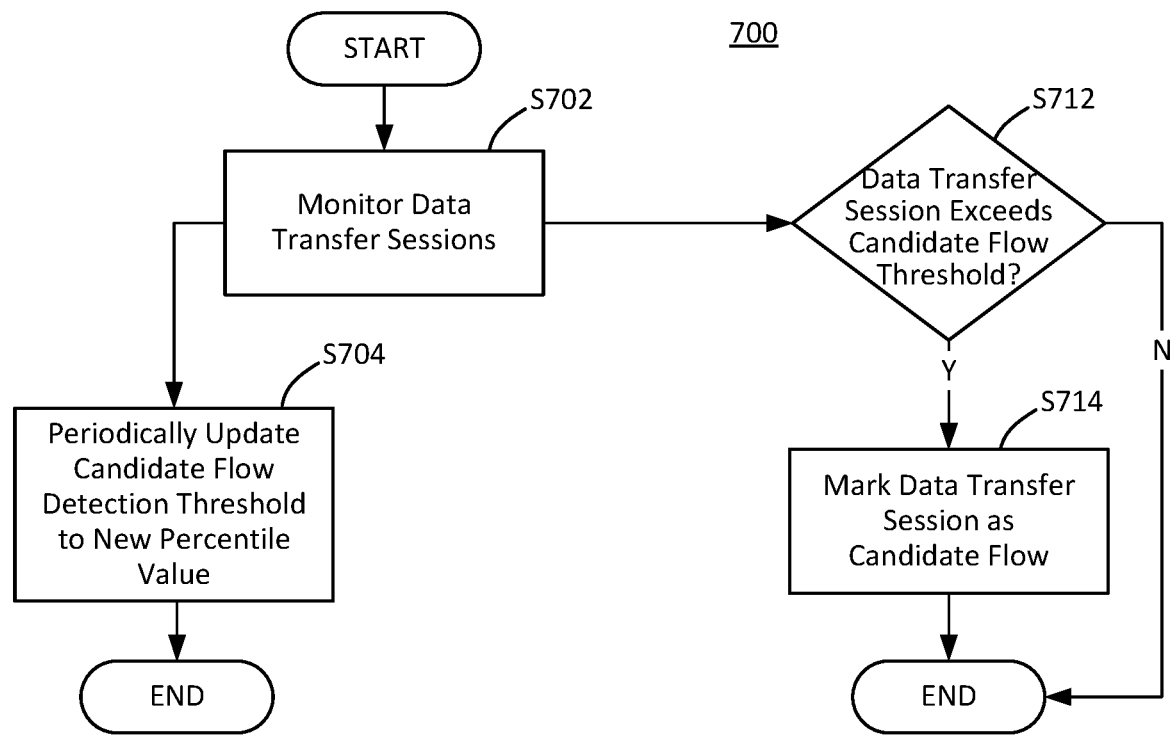
FIG. 7 illustrates decision-making logic in which a flow detector according to an embodiment adjusts a candidate flow detection threshold value to achieve a target percentile value across a group of flows.

FIG. 7 illustrates decision-making logic of a process 700 wherein a flow detector adjusts a candidate flow detection threshold value to achieve a target percentile value across a group of flows according to an embodiment. In FIG. 7, the two arrows originating in S702 indicate potential parallelism: S704 comprises a first subprocess of the process 700, S712 and S714 comprise a second subprocess of the process 700, and the first and second subprocesses may be performed in parallel or in sequence, depend on the embodiment. S702, S712, and S714 of FIG. 7 respectively correspond to S602, S612, and S614 of FIG. 6, and descriptions of S702, S712, and S714 are therefore omitted for brevity.

At S704, the process 700 periodically updates a candidate flow detection threshold according to a distribution of one or more characteristics of data transfer sessions being monitored at S702. The process 700 sets the candidate flow detection threshold so that flows in a target percentile of the characteristic(s) will be considered candidate flows.

For example, in an embodiment, the property being used to determine candidate flows may be an amount of data transferred. At S704, the process 700 would determine the distribution of the amount of data transferred. The process 700 would then identify an amount of data transferred that corresponded to a target percentile. For example, if the target percentile was 90%, the process 700 would determine a $90^{th}$ percentile amount of data transferred for which 90% of the monitored data transfer sessions had less than that amount of data transferred, and for which 10% of the monitored data transfer sessions had at least that amount of data transferred. The process 700 would then set the candidate detection threshold to the determined $90^{th}$ percentile amount of data transferred.

The percentile value could be based on one, several, or a combination of data transfer session characteristics such as amount of data transferred, duration of data transfer, etc. Additionally, the process 700 could be performed across the entire data transport network, for a single network node, for a destination node, for another network node, or for a user device.

Figure 8:
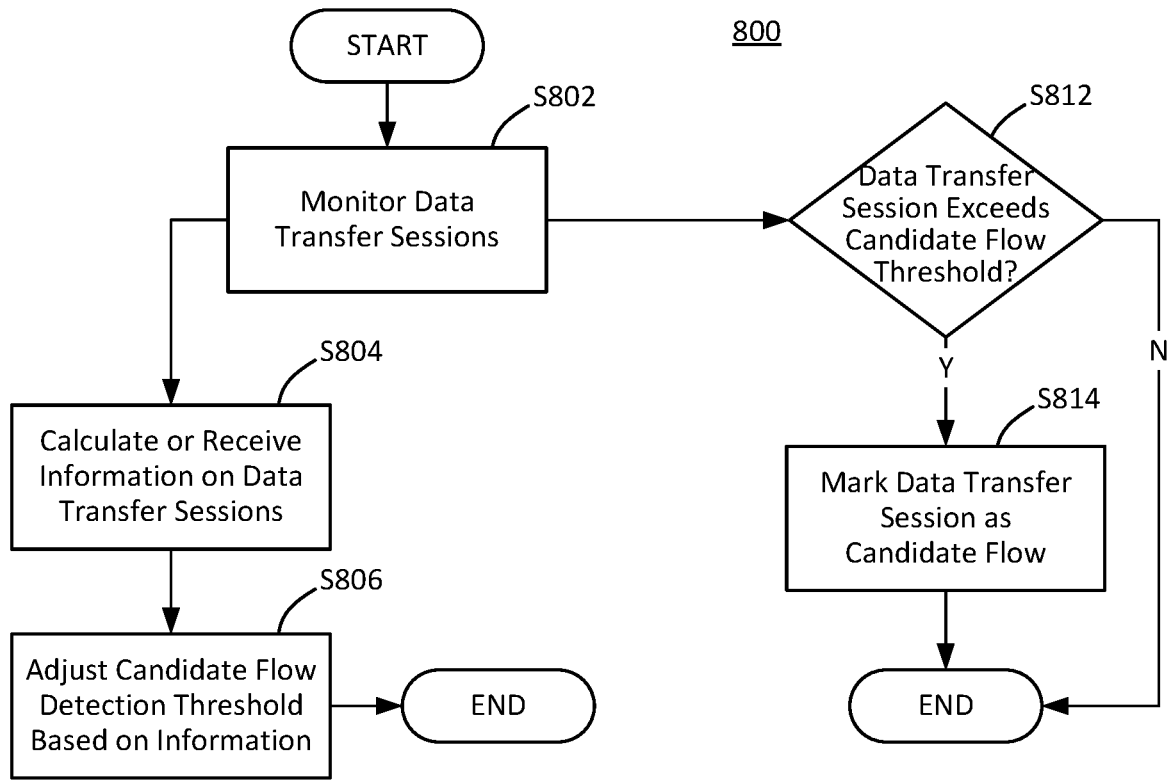
FIG. 8 illustrates decision-making logic in which a candidate flow detector according to an embodiment uses information either gathered by the candidate flow detector or reported from a separate network node, and uses this to adjust the candidate flow detection threshold for those flows.

FIG. 8 illustrates decision-making logic of a process 800 according to an embodiment. In the process 800, a candidate flow detector uses information either gathered by the candidate flow detector or reported from a separate network node, and uses this to adjust the candidate flow detection threshold for those flows. In FIG. 8, the two arrows originating in S802 indicate potential parallelism: S804 and S806 comprises a first subprocess of the process 800, S812 and S814 comprise a second subprocess of the process 800, and the first and second subprocesses may be performed in parallel or in sequence, depend on the embodiment. S802, S812, and S814 of FIG. 8 respectively correspond to S602, S612, and S614 of FIG. 6, and descriptions of S802, S812, and S814 are therefore omitted for brevity.

At S804, the process 800 receives information on data flows from another network node, determines information on data flows monitored at S802, or both.

At S806, the process 800 adjusts or calculates a candidate flow detection threshold using the information received, calculated, or both at S804. The candidate flow detection threshold may be adjusted for either all data transfer sessions or for a subset of data transfer sessions.

In an embodiment, the candidate flow detector would be observing data transfer sessions transiting a data transfer network and internally calculating or receiving information from another network node information on the frequency in which a content distribution node or user equipment device is generating or requesting data transport sessions, and on how often those data transfer sessions are being classified as candidate flows.

In an example embodiment, the candidate flow detector may track the percentage of data transfer sessions generated by a user device that are identified as candidate flows and trigger a change to the candidate flow detection threshold for subsequent data transfer sessions generated by that user device if the percentage of candidate flow data transfer sessions exceeded a set value.

In another example embodiment, the candidate flow detector could determine internally or be notified by another network node of the rate at which candidate flows were being detected for a particular user equipment type (such as a make and/or model of user equipment type) and adjust the candidate flow detection threshold for data transfer sessions for that user equipment type accordingly.

Figure 9:
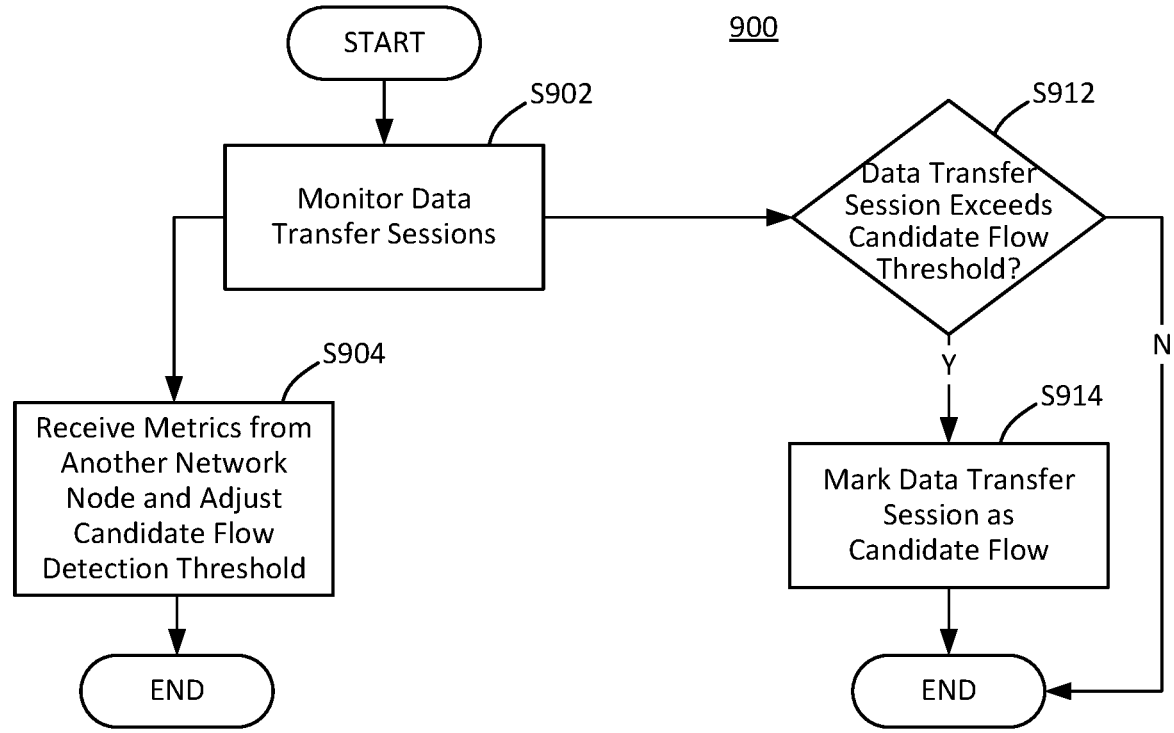
FIG. 9 illustrates decision-making logic in which a candidate flow detector according to an embodiment adjusts a candidate flows threshold value based on information received from another network node.

FIG. 9 illustrates decision-making logic of a process 900 according to an embodiment. In the process 900, a candidate flow detector adjusts a candidate flows threshold value based on information received from another network node. In FIG. 9, the two arrows originating in S902 indicate potential parallelism: S904 and S906 comprises a first subprocess of the process 900, S912 and S914 comprise a second subprocess of the process 900, and the first and second subprocesses may be performed in parallel or in sequence, depend on the embodiment. S902, S912, and S914 of FIG. 9 respectively correspond to S602, S612, and S614 of FIG. 6, and descriptions of S902, S912, and S914 are therefore omitted for brevity.

At S904, the process 900 receives messages from a network node, and may adjust a candidate flow detection threshold for either all data transfer sessions or a subset of data transfer sessions in response to information in the received messages. In embodiments, the information in the received messages may be combined with information derived from the monitoring performed at S902 to adjust the candidate flow detection threshold.

For example, a data transport network could have a network node that collects data transfer session performance metrics from user equipment or other network nodes and sends that information to the candidate flow detector in order to adjust the candidate flow detection threshold. For network nodes or user equipment generating large data transfer sessions which transfer large amounts of data where those data transfer sessions do not degrade network performance or negatively impact other data transfer sessions, the candidate flow detector could increase the candidate flow detection threshold for those types of data transfer sessions. In an embodiment, the data transfer quality reporting network node could be any type of equipment or process and collect and send any kind of metrics to the candidate flow detector.

In an embodiment, a continuous duration of a data transfer session (that is, how long a flow has been operating without interruption) may be used to determine whether a flow is a candidate flow.

Figure 10:
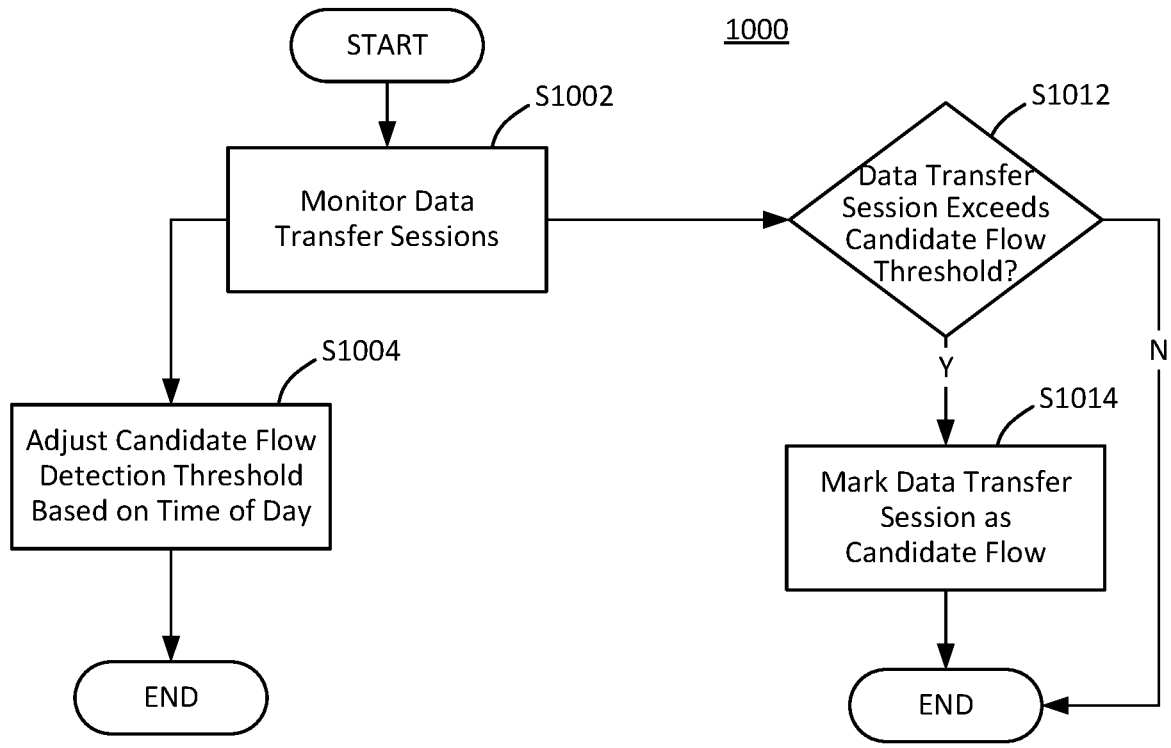
FIG. 10 illustrates decision-making logic in which a candidate flow detector according to an embodiment adjusts a candidate flow detection threshold value based on a time of day.

FIG. 10 illustrates decision-making logic of a process 1000 wherein a candidate flow detector adjusts a candidate flow detection threshold value based on a time of day according to an embodiment. In FIG. 10, the two arrows originating in S1002 indicate potential parallelism: S1004 and S1006 comprises a first subprocess of the process 1000, S1012 and S1014 comprise a second subprocess of the process 1000, and the first and second subprocess may be performed in parallel or in sequence, depend on the embodiment. S1002, S1012, and S1014 of FIG. 10 respectively correspond to S602, S612, and S614 of FIG. 6, and descriptions of S1002, S1012, and S1014 are therefore omitted for brevity.

At S1004, the process 1000 may adjust the candidate flow detection threshold value based on the time of the day. For example, on a typical network node, there is little to no traffic at the 1 AM hour and a peak in traffic around 9 PM. In an embodiment the candidate flow detector could be configured to adjust the candidate flow detection threshold to a higher value during the middle of the night hours and then lower the candidate flow detection threshold values during peak hours to deal with the different traffic conditions that exist on that network node at different times.

In an embodiment, the time of day may include not only an hour of the day, but also a day of the month or year, a day of the week, whether a day is a holiday, and so on. For example, in an embodiment, a candidate flow detection threshold may be adjusted according to whether the current time corresponds to a weekend, or whether a current time corresponds to a duration of a scheduled event that is associated with an increase in network traffic (such as a major sporting event).

Figure 11:
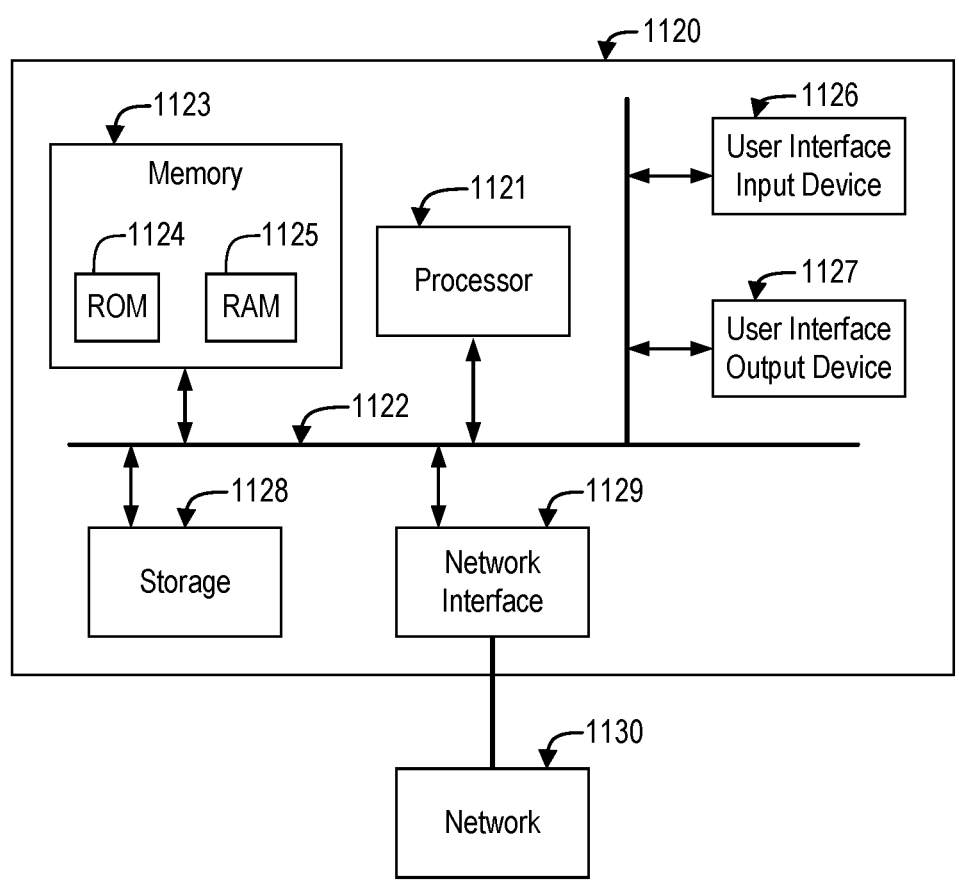
FIG. 11 illustrates a computer system according to an embodiment.

Embodiments of the present disclosure may be implemented in a computer system or on a non-transitory computer readable medium. FIG. 11 illustrates a computer system 1120 including a processor 1121, a bus 1122, a memory 1123, and a user interface input device 1126, a user interface output device 1127, a storage 1128, and a network interface 1129 that is coupled to a network 1130. The processor 1121 may be a central processing unit (CPU) or a semiconductor device that executes processing instructions stored in the memory 1123 and/or the storage 1128. The memory 1123 and the storage 1128 may include various forms of volatile or non-volatile storage media. For example, the memory X23 may include a ROM 1124 and a RAM 125.

Accordingly, an embodiment of the present disclosure may be implemented as a computer implemented method or as a non-transitory computer readable medium with computer executable instructions stored thereon. In an embodiment, when executed by the processor, the computer readable instructions may perform a method according to at least one aspect of the present disclosure.

Although aspects of the present technology have been described with respect to specific examples, embodiments of the present technology are not limited by these examples. For example, persons of skill in the art will recognize that downloading of data by conditionally using idle network capacity may be performed according to various other algorithms and processes without departing from the scope or spirit of the present technology.

What is claimed is:

1. A computer-implemented method for reducing network congestion, comprising:
    detecting one or more data flows in a network;
    determining the throughput of a data flow of the one or more data flows;
    determining, using the throughput of the data flow, a video resolution;
    estimating an encoding rate based on the determined video resolution;
    determining, using the estimated encoding rate, a consumption rate of media data carried by the data flow, the consumption rate being different than a throughput of the data flow;
    determining, by a flow detector device using the consumption rate and a candidate flow detection threshold, whether the data flow is a candidate flow; and
    in response to determining that the data flow is the candidate flow, managing the data flow.

2. The method of claim 1, further comprising:
    determining the throughput of the data flow; and determining, using the throughput, the candidate flow detection threshold according to a transmission time needed to buffer an amount of data corresponding to the consumption rate times a predetermined duration,
wherein determining whether the data flow is the candidate flow includes comparing a duration of the data flow to the candidate flow detection threshold to determine whether the data flow is the candidate flow.

3. The method of claim 1, wherein determining the consumption rate of the media data carried by the data flow comprises:
determining that the data flow carries the media data according to an endpoint of the data flow, traffic pattern recognition, Domain Name System (DNS) sniffing, deep packet inspection, or a combination thereof.

4. A computer-implemented method for reducing network congestion, comprising:
detecting one or more data flows in a network;
determining a consumption rate of media data carried by a data flow of the one or more data flows, the consumption rate being different than a throughput of the data flow;
determining a candidate flow detection threshold by adding a predetermined buffer growth rate value to the consumption rate; and
determining the throughput of the data flow;
determining, using the consumption rate and the candidate flow detection threshold, whether the data flow is a candidate flow; and
in response to determining that the data flow is the candidate flow, managing the data flow,
wherein determining whether the data flow is the candidate flow includes comparing the throughput of the data flow to the candidate flow detection threshold.

5. A transport manager system, comprising:
one or more processors, a network interface, a queue, and a storage communicatively coupled with each other, the storage storing computer executable instructions that, when executed by the one or more processors, cause the transport manager system to:
detect one or more data flows in a network;
determine a consumption rate of media data carried by a data flow of the one or more data flows, the consumption rate being different than a throughput of the data flow;
determine, by a flow detector device using the consumption rate and a candidate flow detection threshold, whether the data flow is a candidate flow;
determine the candidate flow detection threshold by adding a predetermined buffer growth rate value to the consumption rate;
determine the throughput of the data flow; and
in response to determining that the data flow is the candidate flow, manage the data flow,
wherein determining whether the data flow is the candidate flow includes comparing the throughput of the data flow to the candidate flow detection threshold.

6. The transport manager system of claim 5, wherein the consumption rate relates to an encoding rate.

7. The transport manager system of claim 5, wherein the computer executable instructions, when executed by the one or more processors, cause the transport manager system to:
determine the throughput of the data flow, and
determine, using the throughput, the candidate flow detection threshold according to a transmission time needed to buffer an amount of data corresponding to the consumption rate times a predetermined duration,
wherein determining whether the data flow is the candidate flow includes comparing a duration of the data flow to the candidate flow detection threshold to determine whether the data flow is the candidate flow.

8. The transport manager system of claim 5, wherein the computer executable instructions, when executed by the one or more processors, cause the transport manager system to determine the consumption rate of the media data carried by the data flow by determining that the data flow carries the media data according to an endpoint of the data flow, traffic pattern recognition, Domain Name System (DNS) sniffing, deep packet inspection, or a combination thereof.

9. A transport manager system, comprising:
one or more processors, a network interface, a queue, and a storage communicatively coupled with each other, the storage storing computer executable instructions that, when executed by the one or more processors, cause the transport manager system to:
detect one or more data flows in a network;
determine a consumption rate of media data carried by a data flow of the one or more data flows, the consumption rate being different than a throughput of the data flow;
determine the throughput of the data flow;
determine, using the throughput of the data flow, a video resolution;
estimate an encoding rate based on the determined video resolution; and
determine the consumption rate of the media data carried by the data flow based on the estimated encoding rate;
determine, using the consumption rate and a candidate flow detection threshold, whether the data flow is a candidate flow; and
in response to determining that the data flow is the candidate flow, manage the data flow.

10. A non-transitory computer-readable medium (CRM) containing computer programming instructions that, when executed by one or more processor of a transport manager system, cause the transport manager system to perform steps comprising:
detecting one or more data flows in a network;
determining the throughput of a data flow of the one or more data flows;
determining, using the throughput of the data flow, a video resolution;
estimating an encoding rate based on the determined video resolution;
determining, using the estimated encoding rate, a consumption rate of media data carried by the data flow, the consumption rate being different than a throughput of the data flow;
determining, using the consumption rate and a candidate flow detection threshold, whether the data flow is a candidate flow; and
in response to determining that the data flow is the candidate flow, managing the data flow.

11. The CRM of claim 10, wherein the steps further comprise:
determining the throughput of the data flow; and
determining, using the throughput, the candidate flow detection threshold according to a transmission time needed to buffer an amount of data corresponding to the consumption rate times a predetermined duration,
wherein determining whether the data flow is the candidate flow includes comparing a duration of the data flow to the candidate flow detection threshold to determine whether the data flow is the candidate flow.

12. The CRM of claim 10, wherein determining the consumption rate of the media data carried by the data flow comprises:

determining that the data flow carries the media data according to an endpoint of the data flow, traffic pattern recognition, Domain Name System (DNS) sniffing, deep packet inspection, or a combination thereof.

13. A non-transitory computer-readable medium (CRM) containing computer programming instructions that, when executed by one or more processor of a transport manager system, cause the transport manager system to perform steps comprising:

detecting one or more data flows in a network;

determining a consumption rate of media data carried by a data flow of the one or more data flows, the consumption rate being different than a throughput of the data flow;

determining a candidate flow detection threshold by adding a predetermined buffer growth rate value to the consumption rate; and determining the throughput of the data flow;

determining, using the consumption rate and the candidate flow detection threshold, whether the data flow is a candidate flow; and in response to determining that the data flow is the candidate flow, managing the data flow, wherein determining whether the data flow is the candidate flow includes comparing the throughput of the data flow to the candidate flow detection threshold.

14. The CRM of claim 13, wherein the steps further comprise:

determining the throughput of the data flow;

determining, using the throughput of the data flow, a video resolution;

estimating an encoding rate based on the determined video resolution; and determining the consumption rate of the media data carried by the data flow based on the estimated encoding rate.

15. The CRM of claim 13, wherein the steps further comprise:

determining, using the throughput, the candidate flow detection threshold according to a transmission time needed to buffer an amount of data corresponding to the consumption rate times a predetermined duration.

16. The CRM of claim 13, wherein determining the consumption rate of the media data carried by the data flow comprises:

determining that the data flow carries the media data according to an endpoint of the data flow, traffic pattern recognition, Domain Name System (DNS) sniffing, deep packet inspection, or a combination thereof.

* * * * *